(12) United States Patent
Horng

(10) Patent No.: US 6,488,412 B1
(45) Date of Patent: Dec. 3, 2002

(54) BEARING SLEEVE ASSEMBLIES FOR HEAT DISSIPATING FAN MOTORS

(75) Inventor: Alex Horng, Kaohsiung (TW)

(73) Assignee: Sunonwealth Electric Machine Industry Co., Ltd. (TW)

( * ) Notice: Subject to any disclaimer, the term of this patent is extended or adjusted under 35 U.S.C. 154(b) by 0 days.

(21) Appl. No.: 09/397,932

(22) Filed: Sep. 17, 1999

(51) Int. Cl.⁷ ................................................ F16C 19/10
(52) U.S. Cl. ........................................ 384/611; 384/536
(58) Field of Search ................................ 384/611, 613, 384/617, 517, 563, 536

(56) References Cited

U.S. PATENT DOCUMENTS

| 4,719,352 | A | | 1/1988 | Miyatake et al. ........... 384/517 |
| 4,958,945 | A | | 9/1990 | Nakanishi .................... 384/517 |
| 4,997,292 | A | * | 3/1991 | Klimkovsky et al. |
| 5,193,917 | A | * | 3/1993 | Adler et al. ................ 384/517 |

* cited by examiner

*Primary Examiner*—Lenard A. Footland
(74) *Attorney, Agent, or Firm*—Bacon & Thomas, PLLC

(57) ABSTRACT

A bearing sleeve assembly for motors includes a stator seat having an axial tube, a supporting member securely mounted in the axial tube, an elastic member securely mounted in the supporting member and having a contacting section supported by an end of the supporting member, and a bearing which bears against the contacting section of the elastic member and rotatably supports a rotor shaft.

5 Claims, 5 Drawing Sheets

BEARING SLEEVE ASSEMBLIES FOR HEAT DISSIPATING FAN MOTORS

BACKGROUND OF THE INVENTION

1. Field of the Invention

The present invention relates to bearing sleeve assemblies for motors of heat dissipating fans.

2. Description of the Related Art

FIG. 12 of the drawings illustrates a typical bearing sleeve assembly in which a spring 10 is mounted around an end of the rotor shaft 11 which, in turn, is rotatably supported by two bearings 1a and 1b and a sleeve 2 mounted between the bearings 1 and 1b, and the other end of the rotor shaft 11 is retained by a C-clip 4. The spring is expected to provide sufficient force to increase the clearance between the fan blades and the bearing and to reduce the gap as a result of assembly of the elements to thereby reduce the so-called air gap friction during running of the fan blades. In addition, the spring is expected to effectively absorb vibrations generated during running of the motor to thereby reduce the noise. A drawback of such a bearing sleeve structure resides in the difficult assembly of the spring. Further, the vibration-absorbing ability of the spring is unsatisfactory.

The present invention is intended to provide improved bearing sleeve assemblies which mitigate and/or obviate the above problems.

SUMMARY OF THE INVENTION

It is an object of the invention to provide a bearing sleeve assembly which may effectively absorb vibrations generated during running of the motor to thereby reduce the noise.

It is another object of the invention to provide a bearing sleeve assembly which includes an elastic member of rubber, silicon rubber, synthetic rubber, or a combination thereof to replace the spring in the conventional design. The elastic member can be easily, directly assembled with a bearing sleeve or a supporting member.

In accordance with one aspect of the invention, a bearing sleeve assembly for motors comprises:

a stator seat including an axial tube, a supporting member securely mounted in the axial tube and including two ends, an elastic member securely mounted in the supporting member and including a contacting section supported by one of the ends of the supporting member, and a bearing which bears against the contacting section of the elastic member and adapted to rotatably support a rotor shaft.

A second bearing may be mounted around the rotor shaft, and the elastic member may include a second contact section which is opposite to the first-mentioned contact section and supported by the other end of the supporting member, wherein the second bearing bears against the second contact section.

In accordance with another aspect of the invention, a bearing sleeve assembly for motors comprises:

a stator seat including an axial tube, a supporting member securely mounted in the axial tube and including two ends, two bearings respectively, securely mounted to the ends of the supporting member and adapted to rotatably support a rotor shaft, and an elastic member mounted around the rotor shaft and bearing against one of the bearings.

A second elastic member may be mounted around the rotor shaft and bear against the other of the bearings.

In accordance with a further aspect of the invention, a bearing sleeve assembly for motors comprises:

a stator seat including an axial tube, a supporting member securely mounted in the axial tube and including two ends, a bearing securely mounted in the supporting member and adapted to rotatably receive a rotor shaft, the bearing including two sides, and an elastic member mounted around the rotor shaft and bearing against one of the sides of the bearing.

A second elastic member may be mounted around the rotor shaft and bear against the other side of the bearing.

Preferably, the elastic member is made of one of rubber, silicon rubber, synthetic rubber, and combinations of the rubber, silicon rubber and synthetic rubber.

Preferably, the elastic member or the contact section of the elastic member includes knurls, a wavelike surface, or a plurality of recesses defined therein.

Other objects, advantages, and novel features of the invention will become more apparent from the following detailed description when taken in conjunction with the accompanying drawings.

DESCRIPTION OF THE PREFERRED EMBODIMENTS

Figure 1:
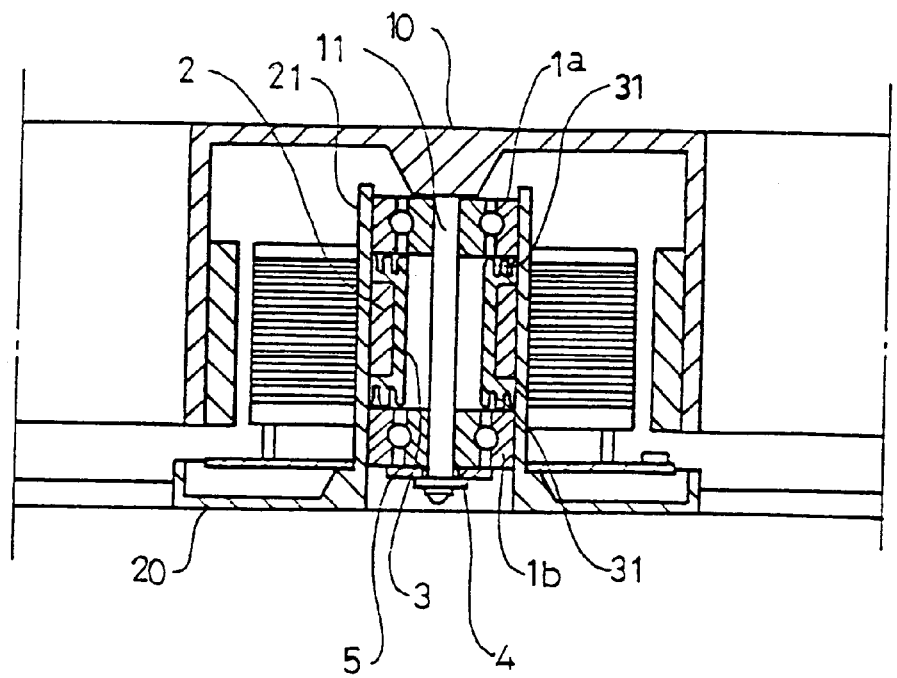
FIG. 1 is a sectional view of a first embodiment of a bearing sleeve assembly in accordance with the present invention.

Referring to the drawings and initially to FIG. 1, a bearing sleeve assembly in accordance with the present invention generally comprises a stator seat 20 having a hollow axial tube 21 for rotatably receiving a shaft 11 of a rotor 10, a supporting member 2, preferably in the form of a hollow cylindrical tube secured to a mediate section of an inner periphery of the axial tube 21, and an elastic means 3 secured to and covered on the axial tube 21. The elastic means 3, preferably made of rubber, silicon rubber, synthetic rubber, or a combination thereof, includes two ends which are respectively extended from upper and lower edges of the axial tube 21 and each of which includes an outwardly extending contact section 31 with knurls or a wavelike structure to provide an increased supporting effect. Two bearings l*a* and 1*b* are mounted in the axial tube 21 and respectively bear against the contact sections 31 on two ends of the elastic means 3. After mounting a washer 5, a retaining member, e.g., a C-clip 4 is applied to-a distal end of the rotor shaft 11 to complete the assembly. The lower bearing 1*b* in FIG. 1 can be omitted.

Figure 2:
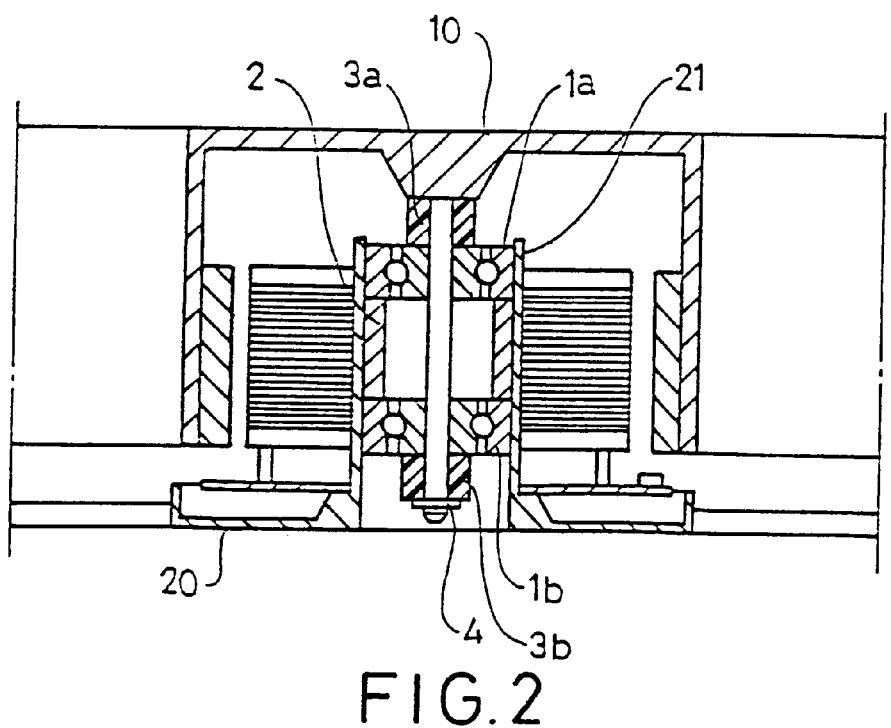
FIG. 2 is a sectional view of a second embodiment of a bearing sleeve assembly in accordance with the present invention.

FIG. 2 of the drawings illustrates a second embodiment of the invention which is substantially the same as the first embodiment except for that the elastic means 3 includes two separate elastic members 3*a* and 3*b* respectively bearing against on the outer sides of the bearings 1*a* and 1*b*.

Figure 3:
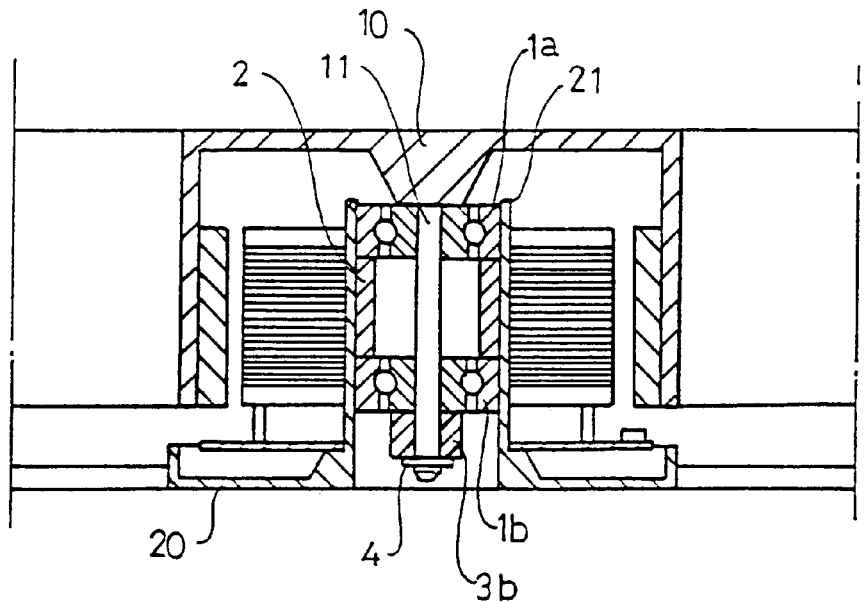
FIG. 3 is a sectional view of a third embodiment of a bearing sleeve assembly in accordance with the present invention.
Figure 4:
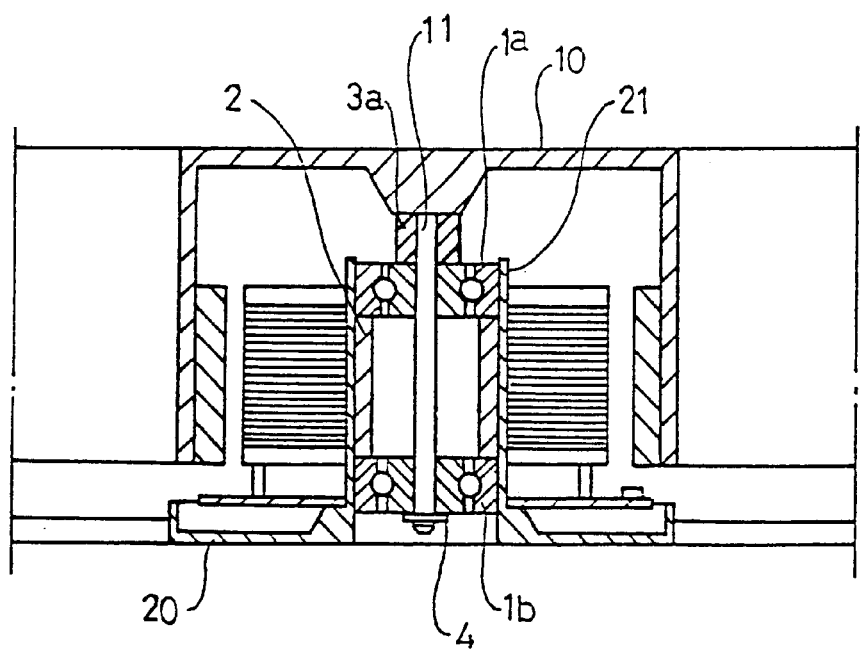
FIG. 4 is a sectional view of a fourth embodiment of a bearing sleeve assembly in accordance with the present invention.

FIG. 3 illustrates a third embodiment of the invention which is substantially the same as the second embodiment except for that the upper elastic member 3*a* is omitted to save cost. FIG. 4 illustrates a fourth embodiment of the invention which is substantially the same as the second embodiment except for that the lower elastic member 3*b* is omitted to save cost.

Figure 5:
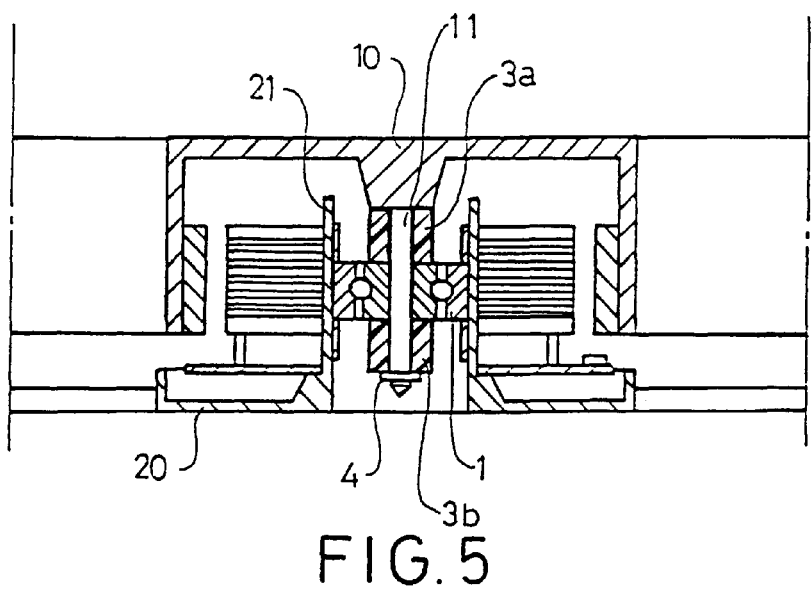
FIG. 5 is a sectional view of a fifth embodiment of a bearing sleeve assembly in accordance with the present invention.
Figure 6:
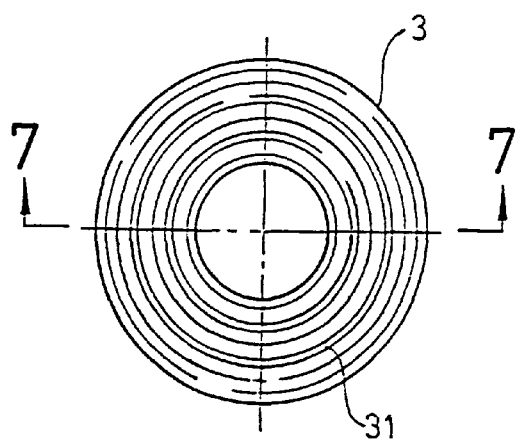
FIG. 6 is a top view of a first embodiment of an elastic member of the bearing sleeve assembly in accordance with the present invention.
Figure 7:
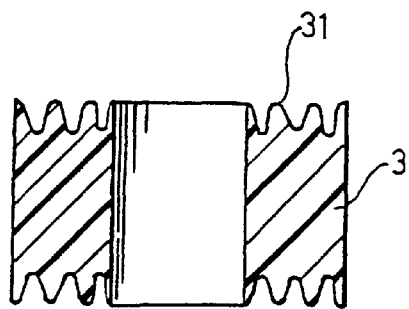
FIG. 7 is a sectional view taken along line 7—7 in FIG. 6.
Figure 8:
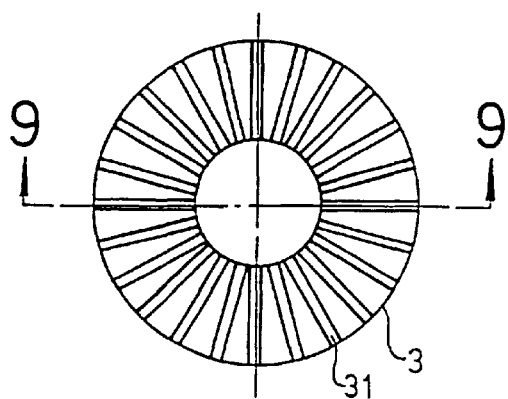
FIG. 8 is a top view of a second embodiment of an elastic member of the bearing sleeve assembly in accordance with the present invention.
Figure 10:
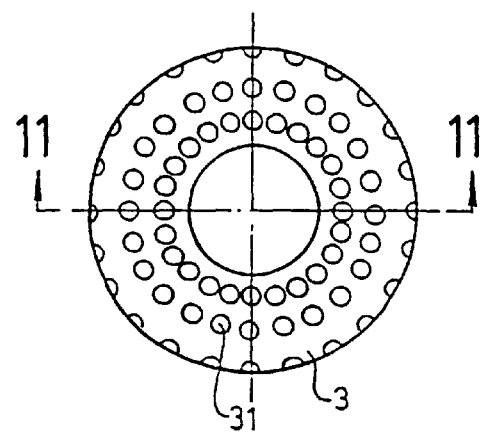
FIG. 10 is a top view of a third embodiment of an elastic member of the bearing sleeve assembly in accordance with the present invention.
Figure 9:
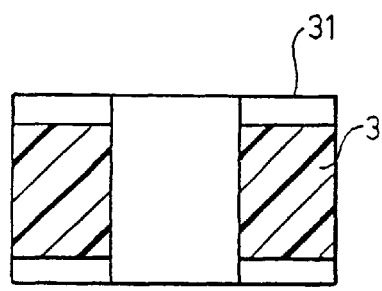
FIG. 9 is a sectional view taken along line 9—9 in FIG. 8.
Figure 11:
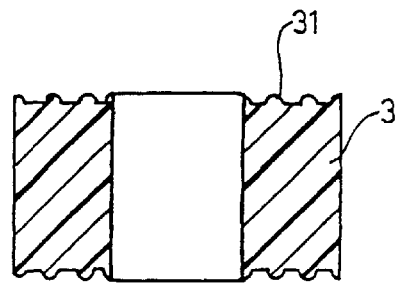
FIG. 11 is a sectional view taken along line 11—11 in FIG. 10.
Figure 12:
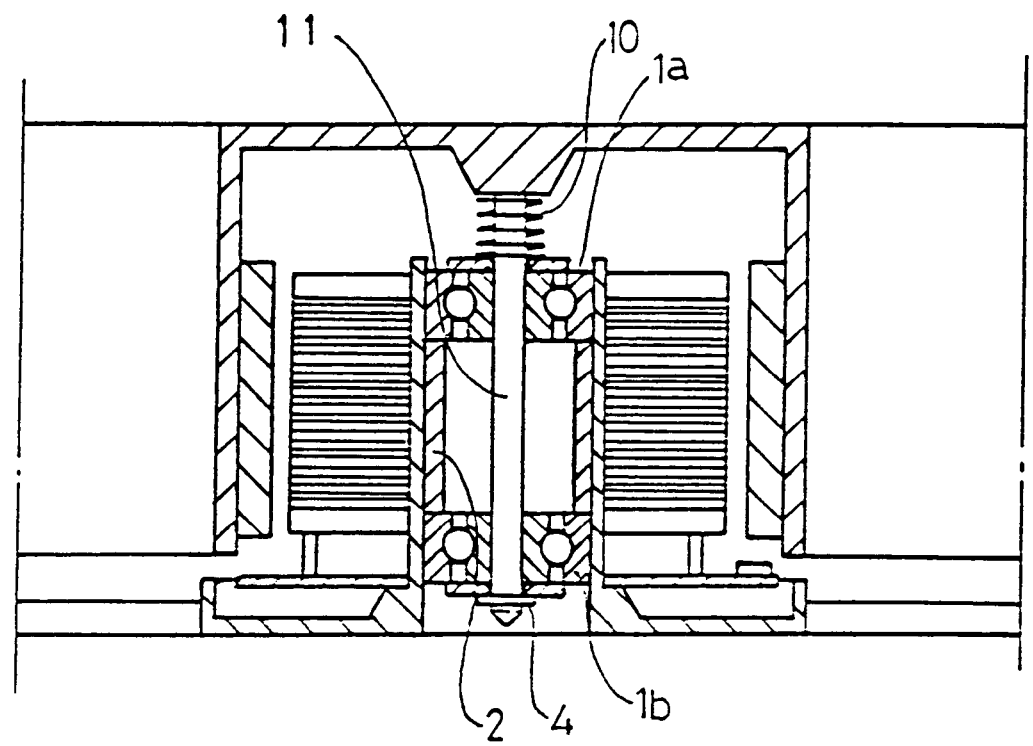
FIG. 12 is a sectional view of a prior art bearing sleeve assembly for heat dissipating fan motors.

FIG. 5 illustrates a fifth embodiment of the invention in which only one bearing 1 is mounted around a mediate section of the rotor shaft 11, and upper and lower elastic members 3*a* and 3*b* are respectively mounted to upper and lower sides of the bearing 1 and around the rotor shaft 11 to reduce the noise and vibrations during running of the motor.

FIGS. 6 to 11 illustrates different embodiments of the elastic means 3. The elastic means 3 in FIGS. 6 and 7 includes annularly disposed recesses (not labeled) in the contact section 31 thereof, the elastic means 3 in FIGS. 8 and 9 includes a wavelike structure in the contact section 31 thereof, while the elastic means 3 in FIGS. 10 and 11 includes knurls formed on the contact section 31 thereof, all of which provide increased air cushion effect in the contact section 31 to reduce the noise and vibrations during running of the motor.

According to the above description, it is appreciated that the bearing sleeve assembly may be used on motors, particularly heat dissipating fan motors. The bearing sleeve assembly may effectively absorb vibrations generated during running of the motor to thereby reduce the noise. Further, the elastic means may replace spring in the conventional design and can be easily, directly assembled with the bearing sleeve.

Although the invention has been explained in relation to its preferred embodiment, it is to be understood that many other possible modifications and variations can be made without departing from the spirit and scope of the invention as hereinafter claimed.

What is claimed is:

1. A bearing sleeve assembly for motors, comprising:
   a stator seat including an axial tube,
   a bearing securely mounted in the axial tube, the bearing is adapted to rotatably receive a rotor shaft, the bearing includes upper and lower sides that are substantially perpendicular to the length of the axial tube,
   an elastic member mounted around and in contact with the rotor shaft, with the elastic member bearing against one of the sides of the bearing and adapted to absorb vibration transmitted from the rotor shaft to the bearing; and
   wherein the elastic member is made from the group consisting of rubber, silicon rubber, synthetic rubber, and a combination of rubber, silicon rubber and synthetic rubber.

2. A bearing sleeve assembly for motors, comprising:
   a stator seat including an axial tube,
   a bearing securely mounted in the axial tube, the bearing is adapted to rotatably receive a rotor shaft, the bearing includes upper and lower sides that are substantially perpendicular to the length of the axial tube,
   an elastic member mounted around and in contact with the rotor shaft, with the elastic member bearing against one of the sides of the bearing and adapted to absorb vibration transmitted from the rotor shaft to the bearing; and
   a second elastic member mounted around the rotor shaft and bearing against the other side of the bearing.

3. The bearing sleeve assembly according to claim 1, wherein the elastic member includes knurls formed thereon.

4. The bearing sleeve assembly according to claim 1, wherein the elastic member includes a wavelike surface opposite one of the sides of the bearing.

5. The bearing sleeve assembly according to claim 1, wherein the elastic member includes a plurality of recesses opposite one of the sides of the bearing.

* * * * *